(12) United States Patent   (10) Patent No.:     US 6,969,074 B2
     Piper                   (45) Date of Patent:    Nov. 29, 2005

(54) SKI-SLED FRAME FOR MOUNTING TO SNOW SKIS

(76) Inventor: Robert W. Piper, 65 Interlachen La., Tonka Bay, MN (US) 55331

( * ) Notice: Subject to any disclaimer, the term of this patent is extended or adjusted under 35 U.S.C. 154(b) by 161 days.

(21) Appl. No.: 10/613,665

(22) Filed: Jul. 2, 2003

(65) Prior Publication Data

US 2005/0001391 A1    Jan. 6, 2005

(51) Int. Cl.$^7$ ............................ B62B 9/04; B62B 13/00
(52) U.S. Cl. .................... 280/14.1; 280/16; 280/17; 280/28.11; 280/22.11
(58) Field of Search ................ 280/14.1, 16, 21.1, 280/22.1

(56) References Cited

U.S. PATENT DOCUMENTS

| | | | |
|---|---|---|---|
| 1,310,252 A * | 7/1919 | Seifert ........................ 188/8 |
| 2,589,764 A * | 3/1952 | Basso ....................... 280/22.1 |
| 2,609,210 A * | 9/1952 | Jennings ................. 280/14.28 |
| 3,081,107 A * | 3/1963 | Cantelli ................... 280/21.1 |
| 3,140,099 A * | 7/1964 | Feu ............................ 280/16 |
| 3,528,674 A * | 9/1970 | Schwarz .................. 280/22.1 |
| 3,799,564 A * | 3/1974 | Eisenschmid ............ 280/14.1 |
| 4,219,207 A * | 8/1980 | Muir et al. .............. 280/22.1 |
| 4,324,409 A * | 4/1982 | Larsen et al. ............ 280/14.1 |
| 4,334,691 A | 6/1982 | Scheib |
| 4,349,209 A | 9/1982 | Chilzer |
| 4,357,036 A | 11/1982 | Zepkowski |
| 4,632,408 A | 12/1986 | Olpp et al. |
| 4,773,659 A | 9/1988 | Rygiel |
| 4,775,161 A | 10/1988 | Bridges |
| 4,796,902 A | 1/1989 | Capra |
| 5,000,466 A | 3/1991 | Den Hartog |
| 5,344,167 A | 9/1994 | Strouth |
| 5,348,322 A | 9/1994 | Rauf et al. |
| 5,413,363 A | 5/1995 | Colin et al. |
| 5,509,665 A | 4/1996 | Hansen |
| D390,500 S | 2/1998 | Walker |
| 6,068,269 A | 5/2000 | Bergeron |
| 6,116,622 A | 9/2000 | Gibbons |
| 6,279,925 B1 * | 8/2001 | Miller ....................... 280/22.1 |
| 6,530,582 B2 | 3/2003 | Dempster |
| 6,575,479 B2 | 6/2003 | Combs |
| 6,905,128 B1 * | 6/2005 | Lear et al. ................... 280/16 |

\* cited by examiner

*Primary Examiner*—Christopher P. Ellis
*Assistant Examiner*—Bridget Avery
(74) *Attorney, Agent, or Firm*—Faegre & Benson LLP

(57) ABSTRACT

A ski-sled frame that can be detachably mounted to a standard pair of skis by attaching the frame to a standard set of ski bindings. The ski-sled may include a seat for carrying the rider, a frame supporting the seat, handles for balance and that aid in steering the ski-sled, and mounting means for attaching the ski-sled to a pair of skis.

7 Claims, 5 Drawing Sheets

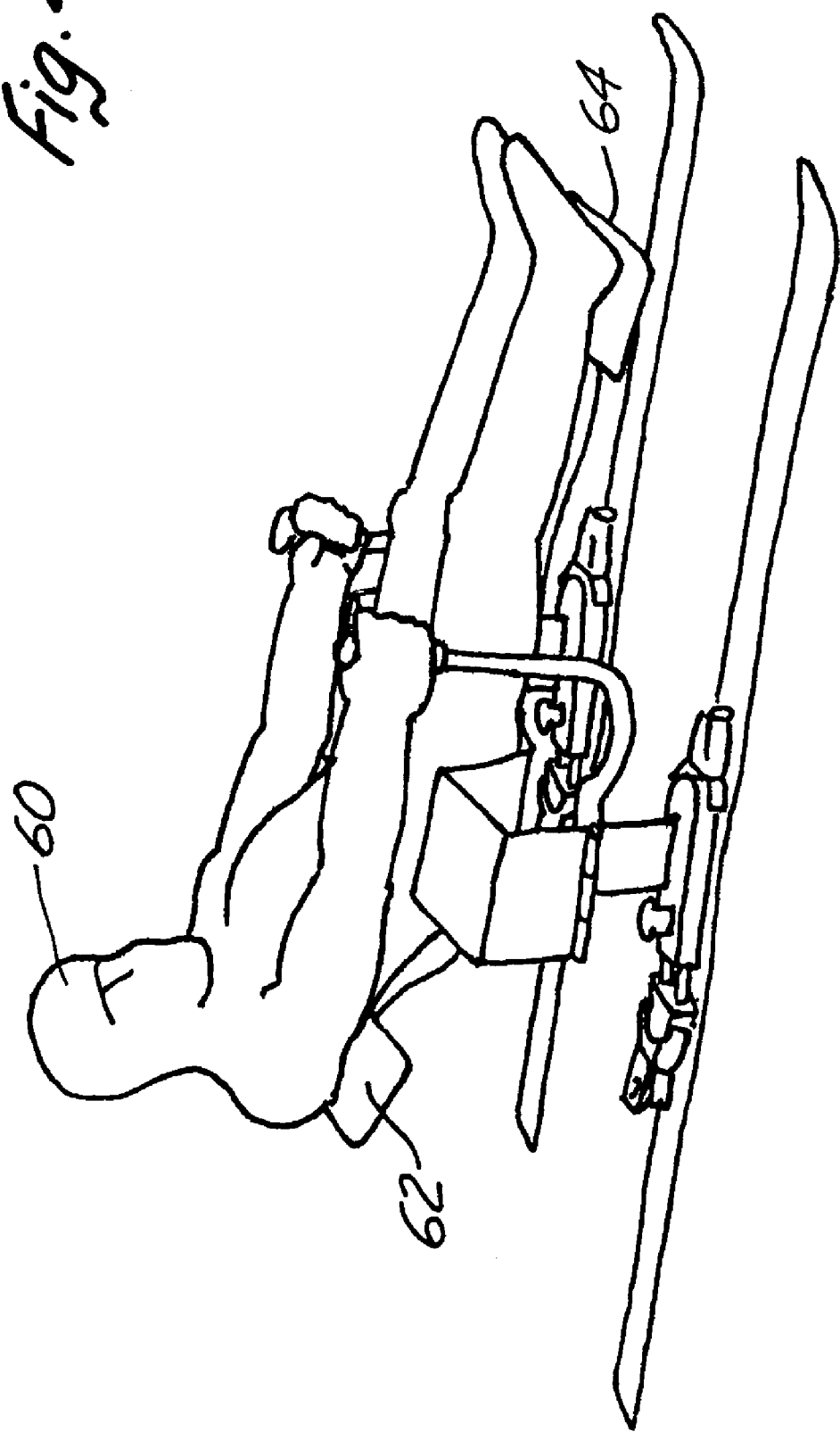

SKI-SLED FRAME FOR MOUNTING TO SNOW SKIS

FIELD OF THE INVENTION

The present invention relates to a ski-sled for recreational use on snow and which is detachably mounted to standard alpine bindings attached to a pair of commercially available snow skis.

BACKGROUND OF THE INVENTION

Ski-sleds have been previously shown to include a frame and a seat for supporting a rider. Such sleds allow a person to ski in the snow while maintaining a sitting or crouching position. Sleds of this kind may include skis, runners or other surfaces for slidingly engaging the snow. The skis, runners or other surfaces that engage the snow are fixedly attached to the seat or frame that supports the rider. Such sleds may be utilized by individuals with certain physical disabilities in order to enjoy the skiing experience in addition to individuals who simply enjoy an alternative to the normal standing skiing experience. Such sleds may also be known as a sit-ski.

When skiing, it is well known that the height, weight and skill of the skier effects whether the skier uses longer or shorter skis. In addition, longer skis allow skiers to achieve higher rates of speed. Furthermore, ski conditions and terrain conditions also indicate the use of different types of skis. One disadvantage to known ski-sleds is the fact that the frames and sleds can not be interchanged for use with different types of skis for different skiers, ski conditions, or speed preferences.

BRIEF SUMMARY OF THE INVENTION

The present invention includes a ski-sled frame that is removably attachable to standard ski bindings in such a way that the ski-sled frame can be utilized with a variety of different types and sizes of skis to meet the preferences and needs of different skiers.

A ski-sled frame for removable attachment to a standard pair of alpine ski bindings, comprising a frame, a seat connected to the frame; a first and second ski connection member pivotally attached to the frame, a first and second ski control rod attached to the first and second ski connection members, respectivelym a first and second foot plate assembly attached to the first and second ski connection members, respectively, the first and second foot plate assemblies further comprising a first and second foot plate extender slidingly engaged to a rear portion of the first and second foot plate assembly whereby the length of the first and second foot plate assembly can be selectively adjusted and whereby the ski-sled frame can be removably attached to a standard pair of alpine ski bindings.

A frame for supporting a rider, comprising, a frame, a seat fixedly attached to the frame, and ski connection means attached to the frame for connecting the frame to a standard pair of ski bindings.

11. A ski-sled frame for removable attachment to a standard pair of alpine ski bindings and skis, comprising a frame, a first foot plate assembly affixed to the frame and a second foot plate assembly affixed to the frame, whereby the first and second foot plate assemblies are removably attached to a standard pair of alpine ski bindings mounted on a pair of snow skis.

BRIEF DESCRIPTION OF THE DRAWINGS

FIG. 4B shows a perspective view of an alternative embodiment of the ski-sled of FIG. 1 with a rider.

DETAILED DESCRIPTION

Figure 1:
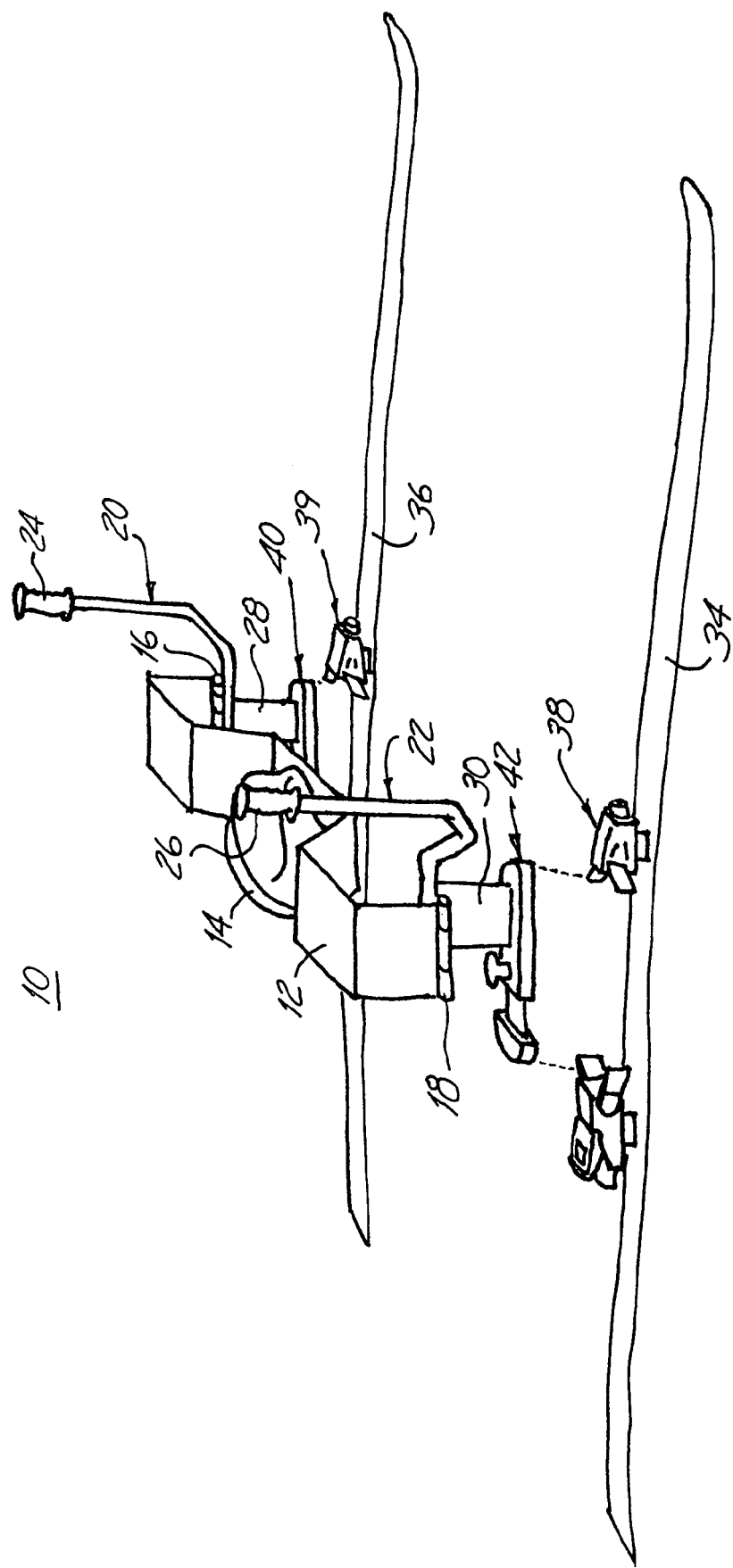
FIG. 1 shows a perspective view of the ski-sled of the present invention attached to a standard pair of snow skis.
Figure 2:
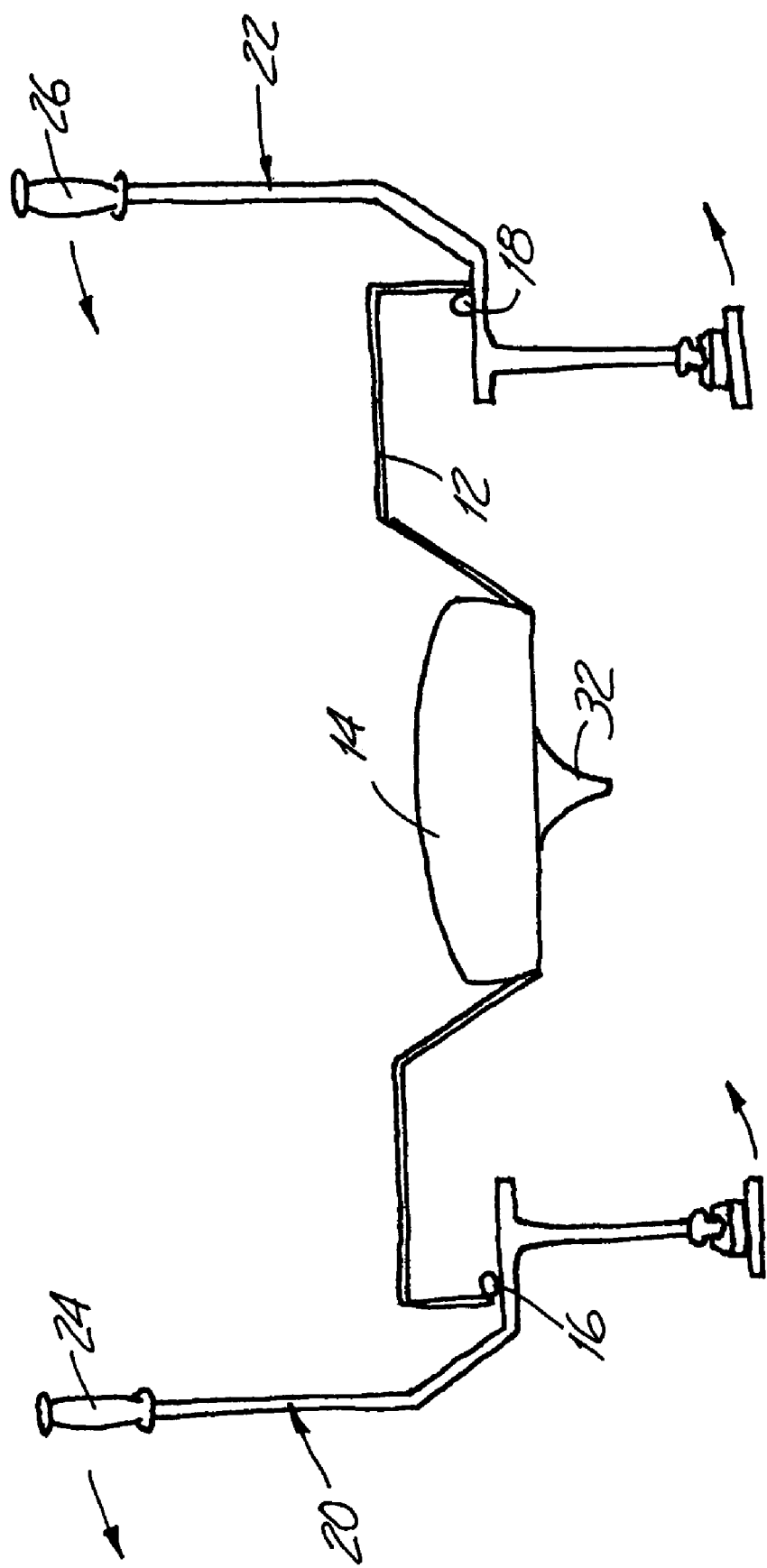
FIG. 2 shows a rear elevational view of the ski-sled of FIG. 1.
Figure 3:
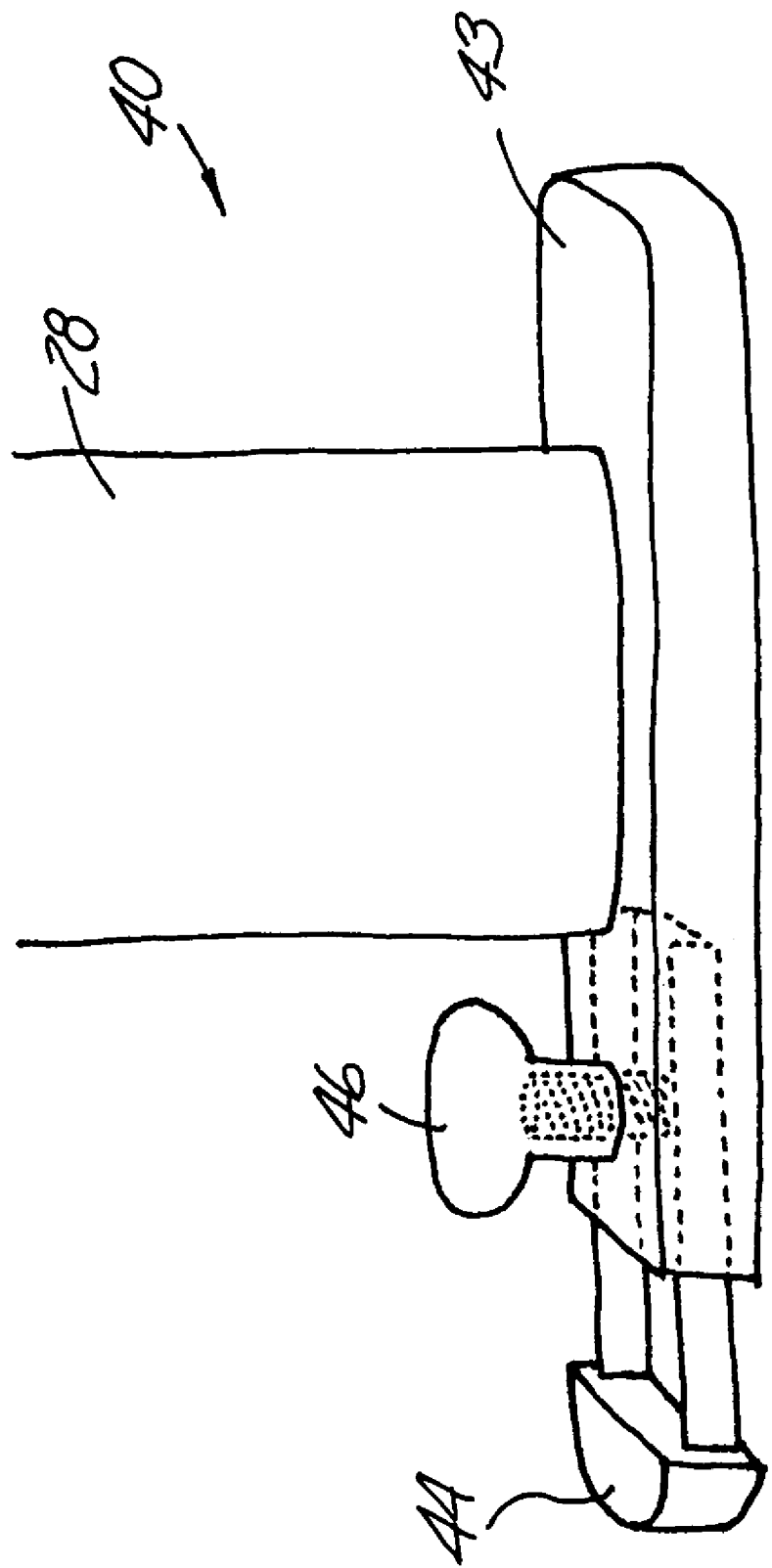
FIG. 3 shows a side perspective view of a adjustable ski connection member of the ski-sled of FIG. 1.

With reference to FIGS. 1–3, a ski-sled according to one embodiment of the present invention will be herein described. The description contained herein is for illustrative purposes and is not meant to exclude any derivations that are within the conceptual context of the present invention. It is contemplated that various deviations can be made to these embodiments without deviating from the scope of the present invention. Accordingly, it is intended that the scope of the present invention be dictated by the appended claims rather than by the below description.

As illustrated in FIG. 1, one embodiment of a ski-sled in accordance with the present invention is identified by the numeral 10. As may be appreciated, the ski-sled as shown is generally symmetrical between each side. Various other embodiments of the ski-sled 10 may further include other features or adjustments depending on the needs of the rider. Such additional features or adjustments may be attached to one side or the other of the ski-sled and may result in a non-symmetrical ski-sled 10. For example, a handicapped rider may require certain types of support or other equipment that a non-handicapped rider would not desire that results in a non-symmetrical ski-sled.

With reference to FIGS. 1 and 2, the ski-sled 10 of the present embodiment generally includes a frame 12, a seat 14, frame connection members 16 and 18, ski control rods 20 and 22, ski connection members 28 and 30 and brake 32. The seat 14 is fixedly attached at a middle portion of the frame 12. Frame connection members 16 and 18 are attached to either side of frame 12 and operably connect the ski connection members 28 and 30 to the frame 12. The ski control rods 20 and 22 are fixed to the ski connections members 28 and 32, respectively. The brake 32 is fixedly attached at a position on the bottom side of frame 12 substantially under seat 14 and is of such a length that the brake 32 can engage the ground when desired by the rider. The frame 10 is shown attached to standard alpine skis 34 and 36 by attaching the frame 12 to standard alpine bindings 38 and 39 mounted on the skis 34 and 36.

The ski control rods 20 and 22 may further include handle grips 24 and 26. Handle grips 20 and 22 provide a convenient contoured place where the rider can grip the ski-control rods 20 and 22 and thereby control the direction and movement of the ski-sled 10. Such operation is further described below.

The frame 12 as illustrated for the present embodiment is a shape generally resembling two inverted U's connected by another U in the middle where the seat 14 is attached. As may be appreciated, the shape of the frame may be in many forms. The frame 12 may be made of any plastic, metal or other generally stiff material, made by plastic molding, welding, grinding or other process, that can withstand the stresses placed thereon. It may be advantageous to construct the frame 12 of such a material that includes a certain amount of flexural properties as are often associated with skis and the like. In addition, the frame 12 can be constructed of multiple materials layered in a manner similar to the construction of skis in order to provide both flexibility and strength. The ski control rods 20 and 22, ski connection members 28 and 30, and the brake 32 may be likewise constructed of materials selected to provide maximum operation and durability. The handle grips 24 and 26 may be rubber or plastic grips as are often found on the end of standard ski poles. The ski control rods 20 and 22 may be constructed of the same, or different, materials than the frame 12. As may be appreciated more in the description below concerning the riding of the ski-sled 10, the ski control rods 20 and 22 should be constructed of an appropriately strong material that can withstand the pressure exerted on the ski control rods 20 and 22 by the rider while steering the ski-sled 10.

In the present embodiment, the frame connection members 16 and 18 are comprised of a pivot joint with a pin rotationally connecting the frame 12 and each ski connection member 28 and 30. As illustrated better in FIG. 2, the frame connection member 16 and 18 are designed such that the frame connection members 16 and 18 allow the ski connection members 28 and 30 to rotate inwardly or outwardly relative to the frame 12. As will be further described below, the ski connection members 28 and 30 are able to rotate in an inwardly or outwardly direction depending on the way in which the rider is steering the ski-sled 10.

As is illustrated in FIGS. 1–3, ski connection members 28 and 30 may further comprise a left foot plate assembly 40 and a right foot plate assembly 42, respectively. Foot plate assemblies 40 and 42 are substantially mirror images of one another and so only foot plate assembly 40 will be further described in detail. Foot plate assembly 40 includes a foot plate 43, a foot plate extender 44 and an extender locking system 46. The forward portion of the foot plate 43 is shaped and sized to approximate the front portion of a standard ski boot. The rear end of the foot plate extender 44 is the size and shape of the rearward portion of a standard alpine ski boot. The foot plate extender 44 slidably engages the rear portion of the foot plate 43 by engaging an interior track in the foot plate 44. By sliding the foot plate extender 44 in or out relative to foot plate 43, the foot plate extender 44 can be used to alter the size of the overall foot plate assembly 40.

The extender locking system 46 of the present embodiment includes a thumb screw 46. The thumb screw 46 can be tightened through a threaded hole in the rear portion of the foot plate 42 and through a hole in the foot plate extender 44 to lock the foot plate extender 44 in the interior track of the foot plate 42. The overall length of the foot plate assembly 40 is thereby selected. The thumb screw 42 may include a plastic T-shaped gripping handle for easy manipulation even when the user is wearing a winter glove. The extender locking system 46 can be replaced with any type of locking system known to those of skill in the art, such as a spring release latch, other types of screws, clamps, and etcetera.

The foot plate assemblies 40 and 42 can be adjusted in length in order to detachably affix the ski-sled 10 to standard ski bindings of different sizes. This feature of the foot plate assemblies 40 and 42 allow the ski-sled 10 to be utilized with different standard alpine skis that have different sized pressure release alpine bindings previously attached thereon. The adaptable ski connection members 28 and 30 therefore allow the ski-sled 10 to be attached to older style straight skis, newer style shaped skis, or any other type of ski that has standard releasable alpine bindings.

In operation, the frame 12 is attached to the desired pair of skis 34 and 36 by attachment to a standard pair of alpine bindings 38 and 39 already mounted thereon. The rider sits on seat 14 and starts the sit-ski 10 moving down the selected hill. When in motion, the rider grips handle grips 24 and 26 to maintain balance and to control the direction of the sit-ski 10. By exerting pressure on the ski control rods 20 and 22 in a left or right direction, the ski connection members 28 and 30 change position relative to the frame 12 and thereby changes the angle of contact the skis 34 and 36 have upon the ground. As is best illustrated in FIG. 2, by exerting left pressure on the ski control rods 20 and 22, the rider may tilt each ski 34 and 36 in a counterclockwise direction, thus causing each ski 34 and 36 to contact the ground on the left side of each ski 34 and 36. By combining this movement with a slight lean, the ski-sled 10 can be steered either left or right. As skiers will appreciate, the change in angle of the skis combined with a leaning motion is substantially similar to turning when skiing in the normal standing position.

When the rider desires to stop forward motion, the rider simply pulls each ski control rods 20 and 22 in an inward direction. Each ski 34 and 36 will then simultaneously rotate in an outward direction and rest on the interior edge of the ski. This action will lower the frame 12 closer to the ground. By pulling in the ski control rods 20 and 22 the correct amount, the brake 32 will then contact the ground and, by dragging, slow the rider to a stop. The rider may alternatively or simultaneously place his or her feet on the ground to stop.

As may be appreciated, in further embodiments the seat 14 may include a spring or other cushioning system. Such a spring or cushioning system may include a simple spring attachment between the seat 14 and the frame 12. In further embodiments the spring or cushioning system may be comprised of a hydraulic-type system or other systems known to those in the art.

Figure 4A:
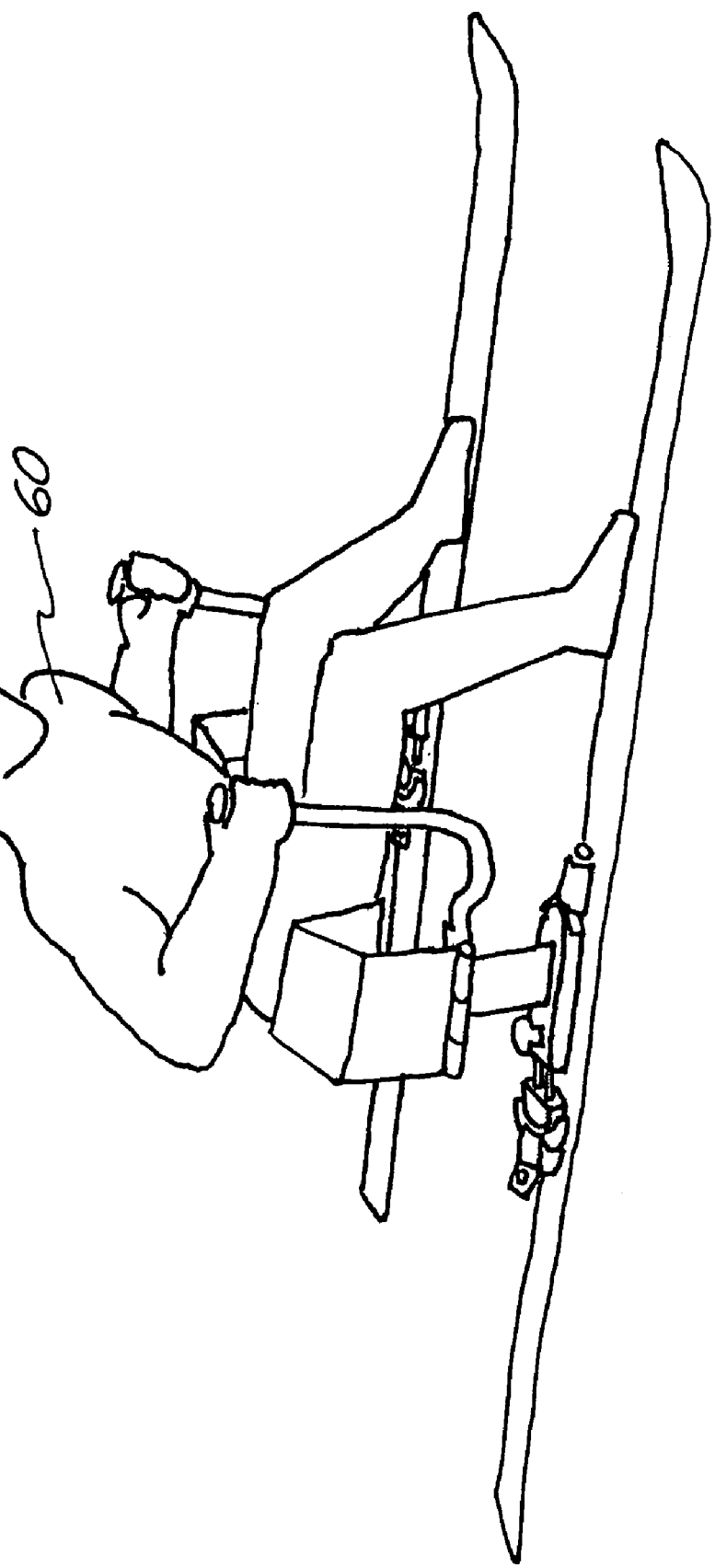
FIG. 4A shows a side elevational view of the ski-sled of FIG. 1 with a rider seated on the seat.

FIG. 4A illustrates a rider 60 seated on a sled 10. The rider 60 sits in a substantially upright position and braces his or her feet on the flat exposed portions of the skis 34 and 36. As may be appreciated, the ski-sled 10 may be ridden in a variety of ways be riders of various skill and experience levels.

As is illustrated in FIG. 4B, the ski-sled 10 may be equipped with a back rest 62. As is illustrated in FIGS. 4A and 4B, the back rest 62 may be fixed or adjustable in order to achieve a substantially upright or a substantially reclined seating position for the rider 60. In additional alternative embodiments the ski-sled may be further equipped with a foot rest 64 that extends forward from the frame 12. The length that the foot rest 64 extends from the 14 may be adjustable to allow the rider 60 to maintain a substantially bent or substantially straight legged position, and to accommodate riders of different heights. Such a foot rest may also include straps or foot holders such as are regularly included on the pegs of off-road bicycles, often referred to as "toe-clips."

The embodiments described herein are for illustrative purposes and are not meant to exclude any derivations or alternative methods that are within the conceptual context of the invention. It is contemplated that various deviations can be made to these embodiments without deviating from the scope of the present invention. Accordingly, it is intended that the scope of the present invention be dictated by the appended claims rather than by the foregoing description of this embodiment.

What is claimed is:

1. A ski-sled frame for removable attachment to a pair of alpine ski bindings, comprising:
   a frame;
   a seat connected to the frame;
   a first and second ski connection member pivotally attached to the frame;
   a first and second ski control rod attached to the first and second ski connection members, respectively;
   a first and second foot plate assembly attached to the first and second ski connection members, respectively,
   the first and second foot plate assemblies further comprising a first and second foot plate extender slidingly engaged to a rear portion of the first and second foot plate assembly whereby the length of the first and second foot plate assembly can be selectively adjusted and whereby the ski-sled frame can be removably attached to a pair of alpine ski bindings; and
   a brake attached to the bottom of the seat such that the brake is disposed between the alpine ski bindings and whereby the brake is engaged with the ground by inward movement of the first and second ski control rods.

2. The sled of claim 1 wherein the bindings are fixedly attached to a pair of snow skis.

3. The sled of claim 1 wherein the ski control rods further comprise handles.

4. The sled of claim 1 wherein the seat is attached to the frame by a spring/cushioning system.

5. The sled of claim 1 wherein the frame includes a foot rest.

6. The sled of claim 1 wherein the frame includes toe clips.

7. The sled of claim 1 wherein the frame includes a back rest.

* * * * *